United States Patent
Kimmel et al.

(10) Patent No.: US 7,549,089 B1
(45) Date of Patent: Jun. 16, 2009

(54) LOST WRITE DETECTION IN A STORAGE REDUNDANCY LAYER OF A STORAGE SERVER

(75) Inventors: Jeffrey S. Kimmel, Chapel Hill, NC (US); Sunitha S. Sankar, Cupertino, CA (US); Tomislav Grcanac, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1008 days.

(21) Appl. No.: 11/118,837

(22) Filed: Apr. 29, 2005

Related U.S. Application Data

(63) Continuation-in-part of application No. 10/951,644, filed on Sep. 27, 2004.

(51) Int. Cl.
*G06F 11/00* (2006.01)
(52) U.S. Cl. .......................................... 714/42
(58) Field of Classification Search .................... 714/42
See application file for complete search history.

(56) References Cited

U.S. PATENT DOCUMENTS

| | | | |
|---|---|---|---|
| 4,887,204 A | 12/1989 | Johnson et al. | |
| 5,379,411 A | 1/1995 | Morgan et al. | |
| 5,432,798 A | 7/1995 | Blair | |
| 5,822,513 A * | 10/1998 | Ofer et al. | 714/42 |
| 6,952,797 B1 | 10/2005 | Kahn et al. | |
| 6,976,146 B1 | 12/2005 | Aiello et al. | |
| 7,043,503 B2 | 5/2006 | Haskin et al. | |
| 2003/0198226 A1 | 10/2003 | Westberg | |
| 2004/0024954 A1 | 2/2004 | Rust | |
| 2004/0034817 A1* | 2/2004 | Talagala et al. | 714/42 |
| 2005/0066230 A1 | 3/2005 | Bean et al. | |
| 2006/0036574 A1* | 2/2006 | Schweigkoffer et al. | 707/2 |
| 2006/0206680 A1* | 9/2006 | Yamanaka et al. | 711/170 |

OTHER PUBLICATIONS

Copeland et al., "A Comparison of High-Availability Media Recovery Techniques", MCC 3500 West Balcones Center Drive, Austin, TX 78759, Copyright 1989, ACM 0-89791-317-5/89/0005/0098, pp. 98-109.

* cited by examiner

*Primary Examiner*—Michael C Maskulinski
(74) *Attorney, Agent, or Firm*—Blakely, Sokoloff, Taylor & Zafman LLP

(57) ABSTRACT

A storage system includes a set of mass storage media and a plurality of functional layers that provide a data storage path between a file system and the set of mass storage media. The storage system can detect that a write issued by the file system was lost by one of the functional layers that provide the data storage path between the file system and the mass storage media.

25 Claims, 5 Drawing Sheets

LOST WRITE DETECTION IN A STORAGE REDUNDANCY LAYER OF A STORAGE SERVER

This application is a continuation-in-part of U.S. patent application Ser. No. 10/951,644, filed on Sep. 27, 2004 and entitled, "Use of Application-Level Context Information to Detect Corrupted Data in a Storage System," of J. Kimmel et al., which is incorporated herein by reference.

FIELD OF THE INVENTION

At least one embodiment of the present invention pertains to data storage system and more particularly, to a technique for detecting lost writes in a storage redundancy layer, such as a RAID layer, of a storage system.

BACKGROUND

Various forms of network storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files in a set of mass storage devices, such as magnetic or optical disks or tapes. The mass storage devices may be organized into one or more volumes of a Redundant Array of Inexpensive Disks (RAID). Enterprise-level filers are made by Network Appliance, Inc. of Sunnyvale, Calif. (NetApp®).

In a SAN context, the storage server provides clients with block-level access to stored data, rather than file-level access. Some storage servers are capable of providing clients with both file-level access and block-level access, such as certain Filers made by NetApp.

In a large scale storage system, it is inevitable that data will become corrupted or stored incorrectly from time to time. Consequently, virtually all modern storage servers implement various techniques for detecting and correcting errors in data. RAID schemes, for example, include built-in techniques to detect and, in some cases, to correct corrupted data. Error detection and correction is often performed by using a combination of checksums and parity. Error correction can also be performed at a lower level, such as at the disk level.

In file servers and other storage systems, occasionally a write operation executed by the server may fail to be committed to the physical storage media, without any error being detected. The write is, therefore, "lost". This type of the fault is typically caused by faulty hardware in a disk drive or in a disk drive adapter dropping the write silently without reporting any error. It is desirable for a storage server to be able to detect and correct such "lost writes" any time data is read.

While modern storage servers employ various error detection and correction techniques, these approaches are inadequate for purposes of detecting this type of error. For example, in at least one well-known class of file server, files sent to the file server for storage are first broken up into 4 KByte blocks, which are then formed into groups that are stored in a "stripe" spread across multiple disks in a RAID array. Just before each block is stored to disk, a checksum is computed for that block, which can be used when that block is subsequently read to determine if there is an error in the block. In one known implementation, the checksum is included in a 64 Byte metadata field that is appended to the end of the block when the block is stored. The metadata field also contains: a volume block number (VBN) which identifies the logical block number where the data is stored (since RAID aggregates multiple physical drives as one logical drive); a disk block number (DBN) which identifies the physical block number within the disk in which the block is stored; and an embedded checksum for the metadata field itself. This error detection technique is referred to as "block-appended checksum".

Block-appended checksum can detect corruption due to bit flips, partial writes, sector shifts and block shifts. However, it cannot detect corruption due to a lost block write, because all of the information included in the metadata field will appear to be valid even in the case of a lost write.

Parity in single parity schemes such as RAID-4 or RAID-5 can be used to determine whether there is a corrupted block in a stripe due to a lost write. This can be done by comparing the stored and computed values of parity, and if they do not match, the data may be corrupt. However, in the case of single parity schemes, while a single bad block can be reconstructed from the parity and remaining data blocks, there is not enough information to determine which disk contains the corrupted block in the stripe. Consequently, the corrupted data block cannot be recovered using parity.

Another technique, which is referred to herein as RAID Double Parity (RAID-DP), is described in U.S. Patent Application Publication no. 2003/0126523. RAID-DP allows two bad blocks in a parity group to be reconstructed when their positions are known.

It is desirable, to be able to detect and correct an error in any block anytime there is a read of that block. However, checking parity in both RAID-4 and RAID-DP is "expensive" in terms of computing resources, and therefore is normally only done when operating in a "degraded mode", i.e., when an error has been detected, or when scrubbing parity (normally, the parity information is simply updated when a write is done). Hence, using parity to detect a bad block on file system reads is not a practical solution, because it can cause potentially severe performance degradation due to parity computation.

Read-after-write is another known mechanism to detect data corruption. In that approach, a data block is read back immediately after writing it and is compared to the data that was written. If the data read back is not the same as the data that was written, then this indicates the write did not make it to the storage block. Read-after-write can reliably detect corrupted block due to lost writes, however, it also has a severe performance impact, because every write operation is followed by a read operation.

Another mechanism is described in the parent of the present application, i.e., U.S. patent application Ser. No. 10/951,644, filed on Sep. 27, 2004 and entitled, "Use of Application-Level Context Information to Detect Corrupted Data in a Storage System," of J. Kimmel et al. The described mechanism stores file system context information in block-appended checksums, for use in detecting lost writes. However, this mechanism can detect data corruption only when the data blocks are accessed through the file system. When block reads are initiated by the RAID layer, such as to compute parity, to "scrub" (verify parity on) a volume, or to reconstruct a block (e.g., from a failed disk), the RAID layer does not have the context information of the blocks. Therefore, this mechanism does not help detect lost writes on RAID-generated reads. RAID-generated reads for parity computations can propagate corruption to parity. Therefore, protection of RAID-generated reads can be crucial in making a storage server resilient to lost writes.

SUMMARY OF THE INVENTION

One aspect of the present invention is a method which includes operating a storage system that includes a set of mass storage media and a functional layer that provides a data storage path between a file system and the set of mass storage media. The method further includes using the functional layer to detect that a data block stored in the set of mass storage media represents a lost write.

Another aspect of the invention is an apparatus, such as a storage server, which can perform such a method Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for detecting lost writes in a RAID layer of a storage server are described. As described further below, in at least one embodiment of the invention, the method assigns a generation count to on-disk data blocks during writes and maintains a copy of the generation count of all the data blocks in a stripe in a bitmap stored in the parity block of the stripe. The generation count indicates the number of times the data block has been written. It is therefore possible when reading a data block to detect a lost write by reading the corresponding parity block and verifying the generation count stored in both the blocks. With this mechanism, a storage operating system can detect blocks corrupted due to lost writes on all reads and can recover the lost data from the parity and remaining data blocks.

In certain embodiments, a generation count is maintained for each data block in a bitmap in an unused region of the parity block's block-appended metadata. When writing a data block, the RAID layer computes the new generation count from the corresponding bits in the parity block's metadata and writes it to the data block's metadata region and to the parity block's metadata region. The generation count in the data block and the parity block should always match; a mismatch indicates a lost write. Hence, by reading the parity block when reading data blocks and comparing the generation count in both, the RAID layer can detect lost writes. This technique is described further below.

Figure 1:
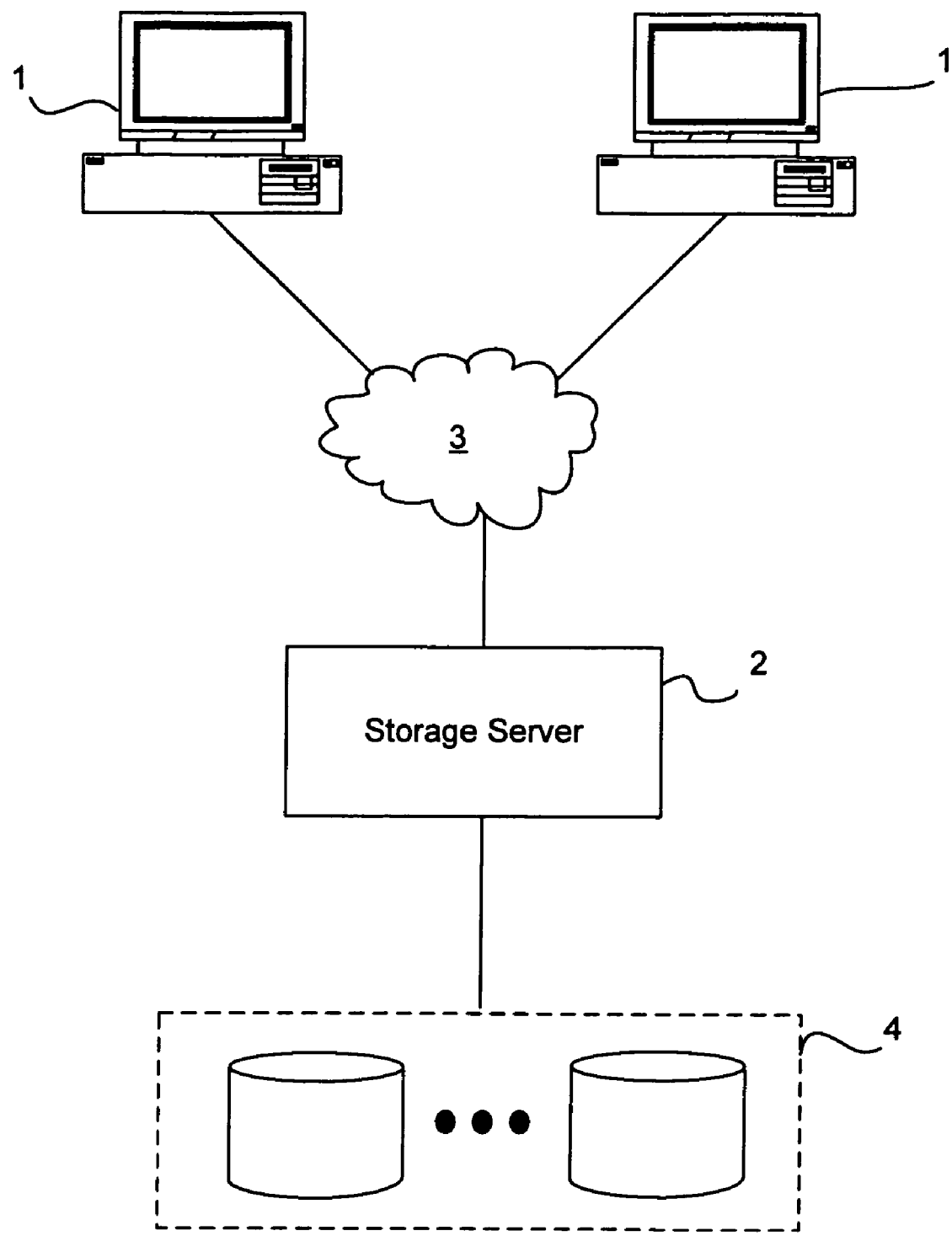
FIG. 1 illustrates a network environment including a storage server.

As noted, the lost write detection technique being introduced here can be implemented in a storage server, such as a file server. FIG. 1 shows a simple example of a network environment which incorporates a storage server 2, which can be a file server. Note, however, that the technique is not limited to use in traditional file servers. For example, the technique can be adapted for use in other types of storage systems, such as storage servers which provide clients with block-level access to stored data or processing systems other than storage servers.

The storage server 2 in FIG. 1 is coupled to a storage subsystem 4 which includes a set of mass storage devices, and to a set of storage clients 1 (hereinafter simply "clients") through a network 3, which may be a local area network (LAN), a wide area network (WAN), a global area network (GAN) such as the Internet, or a combination of such networks. Each of the clients 1 may be, for example, a conventional personal computer (PC), workstation, or the like. The storage subsystem 4 is managed by the storage server 2. The storage server 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data.

The storage server 2 may have a distributed architecture; for example, it may include a separate N- ("network") blade and D- (disk) blade (not shown). In such an embodiment, the N-blade is used to communicate with clients 1, while the D-blade includes the file system functionality and is used to communicate with the storage subsystem 4. The N-blade and D-blade communicate with each other using an internal protocol. Alternatively, the storage server 2 may have an integrated architecture, where the network and data components are all contained in a single box. The storage server 2 further may be coupled through a switching fabric to other similar storage servers (not shown) which have their own local storage subsystems. In this way, all of the storage subsystems can form a single storage pool, to which any client of any of the storage servers has access.

Figure 2:
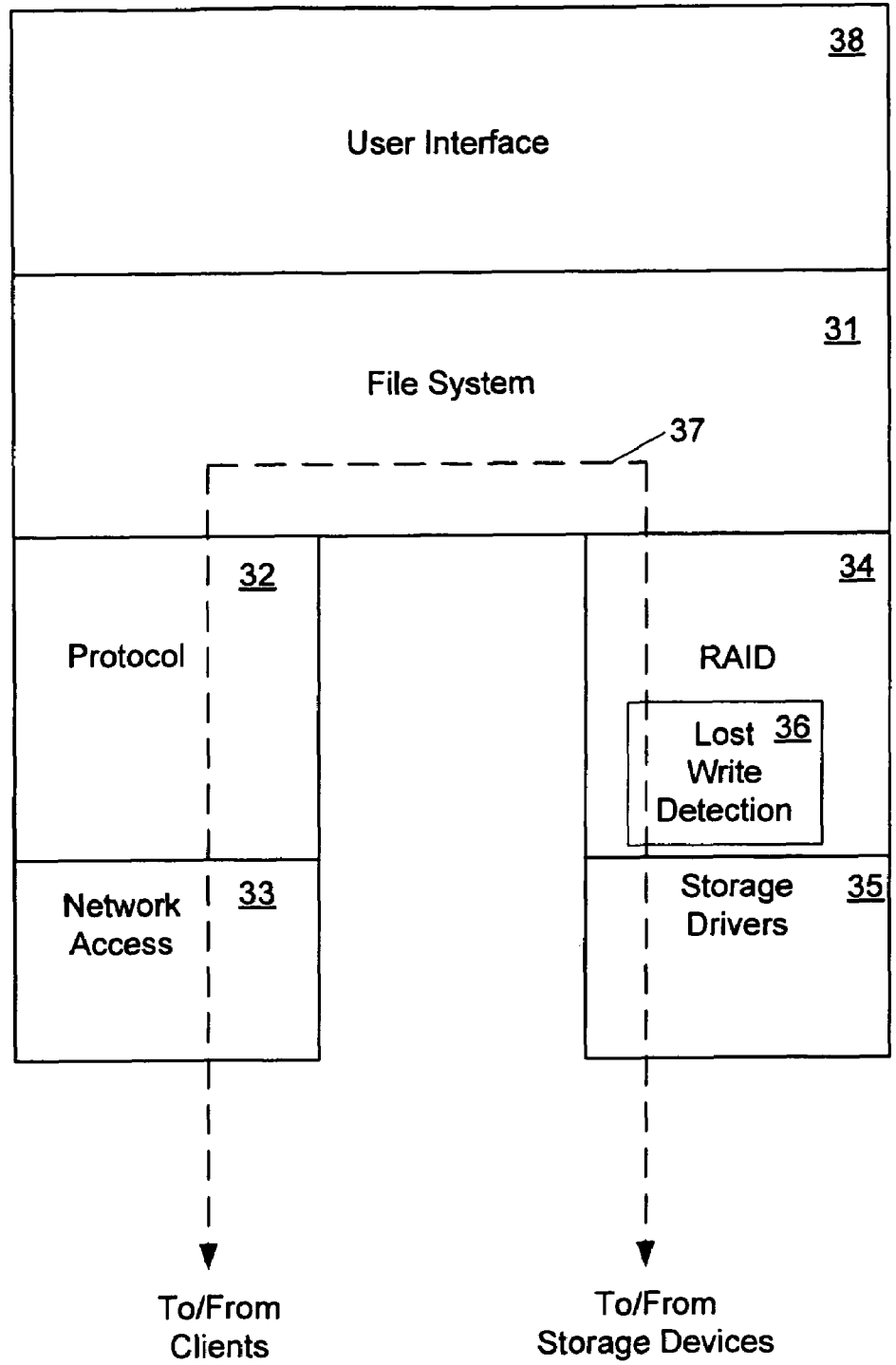
FIG. 2 shows an example of the architecture of the operating system of the storage server.

FIG. 2 shows an example of the operating system 24 of the storage server 2. As shown, the operating system 24 includes several modules, or "layers". These layers include a file system 31. The file system 31 is software that imposes a hierarchy (e.g., a directory/file structure) on the data stored in the storage subsystem 4 and manages read/write operations on the data (i.e., executes read/write operations on the disks in response to client requests). Logically "under" the file system 31, the operating system 24 also includes a protocol layer 32 and an associated network access layer 33, to allow the storage server 2 to communicate over the network 3 (e.g., with clients 1). The protocol 32 layer implements a number of higher-level network protocols, such as Network File System (NFS), Common Internet File System (CIFS), Hypertext Transfer Protocol (HTTP) and/or Transmission Control Protocol/Internet Protocol (TCP/IP). The network access layer 33 includes one or more drivers which implement one or more lower-level protocols to communicate over the network, such as Ethernet or Fibre Channel.

Also logically under the file system 31, the operating system 24 includes a storage access layer 34 and an associated storage driver layer 35, to allow the storage server 2 to communicate with the storage subsystem 4. The storage access layer 34 implements a higher-level disk storage protocol, such as RAID, while the storage driver layer 35 implements a lower-level storage device access protocol, such as Fibre Channel Protocol (FCP) or SCSI. To facilitate description, it is henceforth assumed herein that the storage access layer 34 implements a RAID protocol, such as RAID-4, RAID-5 or RAID-DP, and therefore it is alternatively called the "RAID layer" 34.

Also shown in FIG. 2 is the path 37 of data flow, through the operating system 24, associated with a read or write operation.

Logically above the file system 31, the operating system 24 also includes a user interface 38 to generate a command line interface (CLI) and/or graphical user interface (GUI) to allow administrative control and configuration of the storage server 2, from a local or remote terminal.

As shown in FIG. 2, in one embodiment of the invention the RAID layer 34 includes a lost write detection module 36, which performs operations associated with the technique being introduced here, as described above and as further described below.

Figure 3:
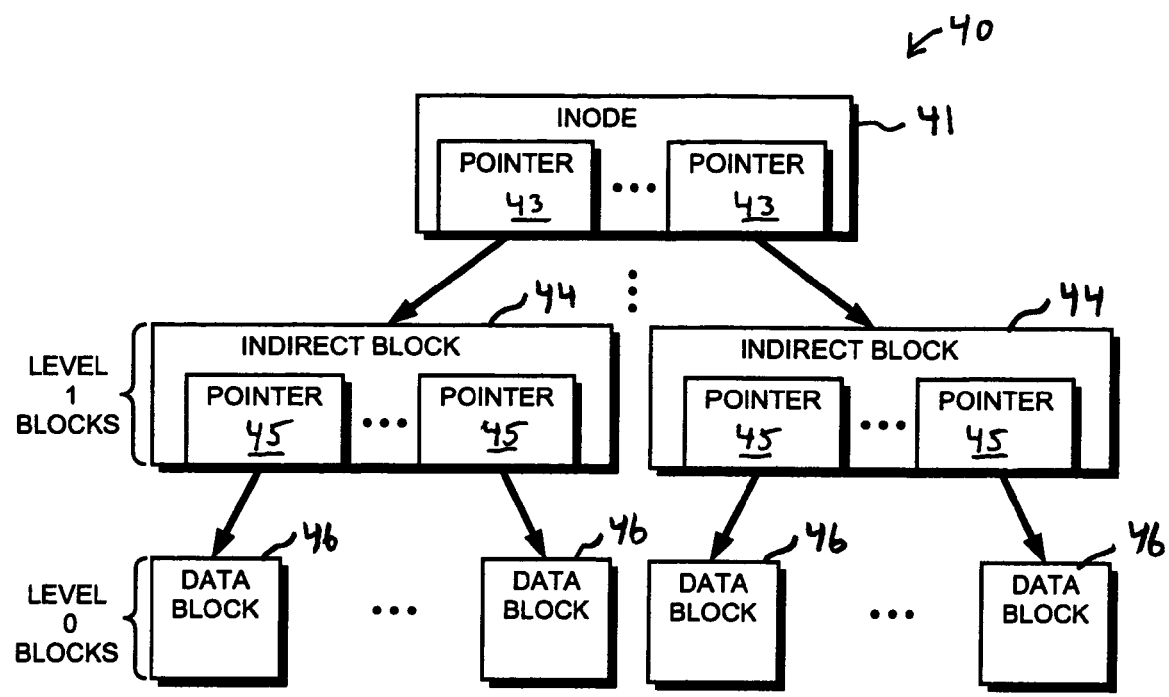
FIG. 3 shows a buffer tree representing a file stored by the storage server.

In the file system, each file is stored in the form of a "buffer tree". A buffer tree is an internal representation of the data blocks for a file. An example of a buffer tree is shown in FIG. 3. Each buffer tree has an inode 41 at its root (top-level). An inode 41 is a data structure which used to store information about the file, such as metadata. The inode is stored in a separate inode file. The information contained in an inode 41 may include, for example, ownership of the file, access permission for the file, size of the file, file type and references to locations on disk of the data blocks for the file.

The data blocks are structures used to store the actual data for the file. As used herein, the term "block" can mean any chunk of data which the file system 31 is capable of recognizing and manipulating as a distinct entity. While in this description a block is described as being a 4 Kbyte chunk, in other embodiments of the invention a "block" may have a different size.

The references to the locations of the file data are provided by pointers 43 in the inode 41, which may point to indirect blocks 44 (also called "Level 1 blocks" or "L1 blocks"). The indirect blocks 44 contain pointers 45 that reference the actual data blocks 46 (also called "Level 0 blocks" or "L0 blocks"), depending upon the quantity of data in the file. To facilitate efficiency among the file system and the RAID system when accessing the data on disks, each pointer 45 to a data block 46 may be a virtual block number (VBN). A VBN identifies a logical disk in which the block is stored.

Note that there may be additional levels of indirect blocks (e.g., level 2, level 3) depending upon the size of the file. That is, the data of the file are contained in direct (L0) blocks 46 and the locations of these blocks are stored in the indirect (L1) blocks 44 of the file. In one embodiment, each indirect block 44 can contain pointers to as many as 1,024 direct blocks. In certain embodiments, the file system 31 has a "write anywhere" property, such that these blocks may be located anywhere in the storage subsystem 4. The logical (sequential) position of a data block 46 within a file is indicated by a file block number (FBN).

The RAID layer 34 maintains information about the geometry of the underlying physical disks (e.g., the number of blocks in each disk) in RAID labels stored on the disks. The RAID layer 34 provides the disk geometry information to the file system for use when creating and maintaining the VBN-to-DBN mappings used to perform write allocation operations and to translate VBNs to disk locations for read operations. Block allocation data structures are used to describe block usage within the active file system. These mapping data structures are independent of the storage geometry and are used by a write allocator of the file system layer 31 as existing infrastructure for a logical volume.

Figure 4:
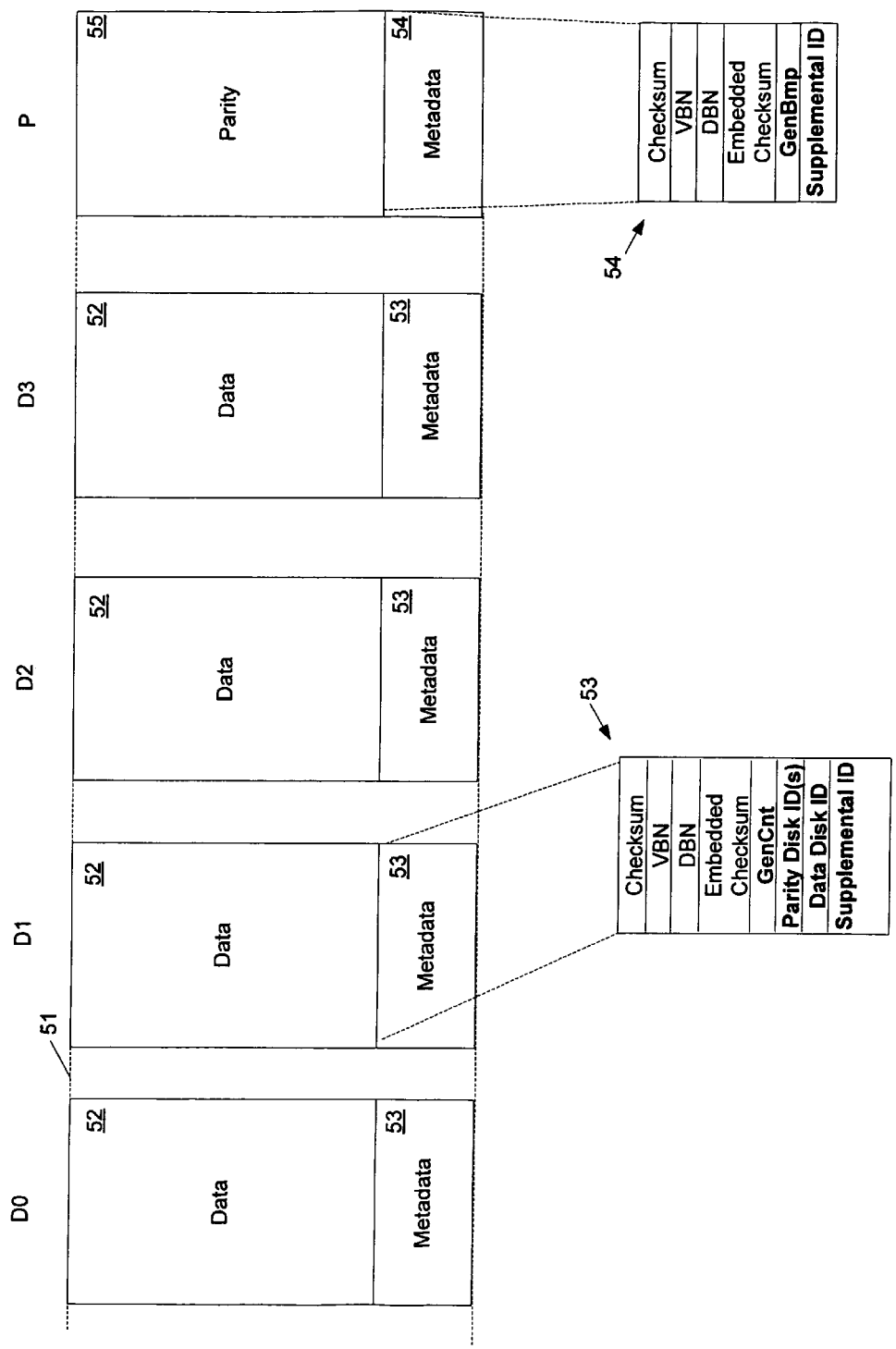
FIG. 4 shows a stripe of data stored in a parity group, where each block includes block-appended metadata for use in protecting against lost writes.

Each file stored by the storage server 2 is broken up by the file system 31 into data blocks, which are 4 Kbyte long in certain embodiments of the invention. The RAID layer 34 spreads data blocks across multiple disks in the storage subsystem 4 by the RAID layer 34 in one or more stripes, according to a RAID protocol. FIG. 4 illustrates a single stripe 51 in an illustrative parity group (e.g., RAID group) that contains four data disks (D0, D1, D2 and D3) and a parity disk (P). Note, however, that other configurations can be used in conjunction with the technique being introduced here. In the illustrated embodiment, each stripe contains one data block 52 from each of the data disks and the parity disk.

Just before a data block 52 is stored on disk, a checksum is computed for the block. The checksum can be used during a subsequent read to determine if there is an error in the block. The checksum is included in a metadata field 53 that is appended to the end of the data block 52 just before the block is stored to disk. Although the format of a metadata field 53 of only one block 52 is shown in detail in FIG. 4, all data blocks 52 have a metadata field 53 with essentially the same format as shown. In certain embodiments, the metadata field 53 is 64 bytes long. The metadata field 53 also contains the VBN and DBN of the data block 52, as well as an embedded checksum for the block-appended metadata itself. In addition, each block 55 in the parity disk P also has an appended metadata field 54 that includes the aforementioned types of information for that block, as shown.

Further, according to embodiments of the invention, the metadata field 53 of each data block 52 on each of the data disks also includes a generation count ("GenCnt"). The GenCnt is indicative of how many times the data block 52 has been written. For each stripe 51, the metadata field 54 appended to the parity block 55 for that stripe (which is stored on the parity disk, P) includes a generation bitmap ("GenBmp"), which is a concatenation of all of the GenCnt values of the data blocks 52 in that stripe 51. Before writing to blocks, the new GenCnt for each data block 52 is computed from the current value stored in the parity GenBmp obtained by reading the parity disk, P.

Note that while the GenBmp is generally described herein as being stored in the parity disk, that does not have to be the case. The GenBmp can be stored in any of the mass storage devices in a parity group. However, storing it on the parity disk is desirable from performance and data availability standpoints, since the parity disk is read anyway during writes, for purposes of parity calculation.

The GenCnt and GenBmp are used during reads to detect a stale data block, i.e., a data block representing a lost write. Specifically, when reading a data block 52, the GenCnt of that data block is compared against the corresponding bits in the GenBmp, which is stored in the metadata field 54 of the corresponding parity block 55. If the bits match, the data block is considered to be correct. If the bits do not match, then the data block may be considered to contain stale data (e.g., a lost write).

In certain embodiments, however, the data block is considered to contain stale data only if its GenCnt bits do not match the corresponding bits in the GenBmp while the GenCnts of all other data blocks in the stripe do match the corresponding bits in the GenBmp. Such embodiments based on the fact that lost writes are so rare that observing two or more of them in the same stripe is extremely unlikely. Therefore, in such embodiments, when two or more data blocks have a GenCnt that does not match the corresponding bits in the GenBmp, the parity disk is considered to be stale, and a software error is assumed to be the cause rather than a lost write. In that case, the existing data are not changes. As an alternative embodiments, multiple suspected lost writes could instead be treated as a fatal error.

In certain embodiments, each GenCnt is a two-bit value. A block that has not been written will have GenCnt=0. On the first write, the GenCnt is incremented to 1, and on each subsequent write the new GenCnt is incremented by one (where the current GenCnt is obtained by reading the parity block), subject to a "wraparound function". The wraparound function means that if GenCnt currently equals 3 (decimal values are used here to facilitate description), then the next time it is incremented it will be set back to 1. Thus, a block that has been written will have GenCnt=1, 2, or 3.

When the GenCnt value of a data block and the corresponding bits of the GenBmp differ, the "higher" value (subject to the wraparound function) is assumed to be correct: Thus, if the values observed are 0 and 1, then the block containing 1 would be considered the correct one. Similarly, for 1 and 2 the block containing 2 would be considered the correct one; for 2 and 3 the block containing 3 would be considered the correct one; and for 3 and 1, the block containing 1 would be considered the correct one. When a zero and a non-zero generation count is observed, the block with non-zero is always assumed correct.

The GenCnt of all the data disks in a parity group are stored in the GenBmp in the parity disk, for each stripe. In the generation bitmap, GenBmp, of each stripe, the two-bit GenCnt of each data block is stored in bits (2*raid_local_id) and (2*raid_local_id)+1. The value "raid_local_id" is a unique number such that 0<raid_local_id<28, assuming a maximum RAID group size of 28 disks. The RAID layer 34 assigns a raid_local_id to each disk in the RAID group. For a maximum RAID group size of 28 disks, 56 bits are used to store generation count. In that case, a 7-byte field in the metadata field can be used to store the GenBmp.

The following is an example of the parity block's GenBmp, showing the GenCnt of a disk with raid_local_id=12 in bold type (starting from the right with raid_local_id=0):

00 10 11 00 00 01 10 11 01 10 00 11 11 01 01 11 10 00 11 00 10 11 00 01 11 01 00 00

If a form of RAID which uses multiple parity disks per parity group is being used (e.g., RAID-DP), the GenCnt is stored on each of the parity disks in the parity group (e.g., Row Parity and Diagonal Parity in the case of RAID-DP). However, it is sufficient to read only one of the parity disks to verify the GenCnt against the GenBmp.

The technique introduced here can be employed advantageously when reconstructing a faulty disk. Specifically, by verifying the GenCnt of the blocks read for reconstructing a data disk, it is possible to detect any lost writes. If a lost write is detected on a RAID-DP volume doing a single reconstruction, for example, the bad disk can be recommended for failure. For other cases, the same steps can be performed as done when encountering a media error during reconstruction. The details of such steps are not germane to the invention and need not be described herein.

When reconstructing a data disk, the GenCnt of each block is obtained from the corresponding parity block (i.e., from the GenBmp) and for parity disks the GenBmp is constructed from all of the data disks in the RAID group. By writing GenCnt to the reconstructing disk, a lost reconstruction write can be detected in the subsequent read to those blocks.

The technique introduced here can also be employed advantageously when "scrubbing" (verifying parity and checksums on) a RAID group. For example, the scrub process, in addition to verifying parity and checksums, can also verify the GenCnt of the blocks. If a lost write is detected, the RAID layer 34 can recommend (to a higher-level software layer) that the disk be considered failed.

Various extensions, modifications and/or optimizations of this technique are possible. In that regard, note that if RAID-4 is being used, and a disk with greater capacity than the parity disk is added to a RAID group, the parity disk is flipped to become a data disk, and the new disk becomes the parity disk. In semi-static RAID also, when new disks are added, the location of parity will change as determined by the "parity table". In both of these cases, when the parity location changes, the GenCnt and the reads to data blocks for which the parity changed will not be protected.

In the new parity block, the GenCnt bits will be zero for the data blocks that were written before the parity flip. The GenCnt in the parity block can be zero due to either a change in the parity block location (parity flip) or a lost write on the parity disk.

Therefore, in addition to storing a GenCnt for each data block on the data disks, a parity disk identifier (ID) can also be stored in the metadata 53 of all data blocks 52 on the data disks (as shown in FIG. 4), to identify the disk to which the parity information was written (the parity disk). By using the parity disk ID, it is possible distinguish a parity flip scenario from a lost write. The parity disk ID can be the "raid_local_id" of the parity disk. If using a form of RAID that includes multiple parity disks per parity group (e.g., RAID-DP), then the parity disk ID of each parity disk is stored in the metadata of all data blocks on the data disks.

When the GenCnt of a block is zero in the parity block (i.e., in GenBmp) and non-zero on the data disk, the RAID layer 34 compares the parity disk ID(s) in the data block's metadata and the actual parity disk ID(s). If the values match, a lost write on the parity disk is indicated. If they do not match, a parity flip is indicated.

There is also a possibility, in rare cases, that the raid_local_id of a data disk may change after data was written to the disk. Therefore, as shown in FIG. 4, the data disk ID is also stored in the metadata of blocks on that disk. When reading a block, if the stored disk ID does not match the raid_local_id of that disk, the block is not protected.

Various optimization issues may arise in connection with the lost writes detection technique being introduced here. One such issues arises in the case of a write that affects all of the blocks in a stripe (a "full-stripe write"). In that case, it is not necessary to read any of the blocks in the stripe in order to compute parity, since all of the blocks are being newly written. In fact, it is desirable from a performance standpoint not to have to read any blocks during a write. Yet the technique being introduced here, as described thus far, would require a read of at least the GenCnt and GenBmp values, even in the case of a full-stripe write. So the lost writes detection technique, as described thus far, could have a negative performance impact in the case of a full-stripe write.

Therefore, to eliminate the need to read any blocks, even during a full-stripe write, the following approach can be used: First, for all of the disks a GenCnt value is selected blindly, i.e., without reading the GenCnt values already on the disks. The GenCnt in this case can be, for example, a random number or the same number for all disks. No matter how the GenCnt is selected, if the GenCnt has relatively few (e.g., two) bits, there is a relatively high probability that the selected number matches the one that is already written on the disk, so it will not be effective for lost write detection.

Therefore, an additional identifier ("supplemental ID") is also stored in the metadata field 53 of each data block 52 in the stripe and the metadata field 54 of the corresponding parity block(s) 55, as shown in FIG. 4. The supplemental ID is the same on all disks in the parity group, including the parity disk(s). On a subsequent read of a block (e.g., during a RAID scrub or reconstruction), the supplemental ID stored with the data block is compared to the supplemental ID in the corresponding parity block, in addition to comparing the GenCnt value with the GenBmp as described above. Only if both pairs of numbers match will the block be considered to contain correct data. Otherwise, the block will be considered stale (i.e., a lost write).

The supplemental ID can be, for example, a timestamp with appropriate resolution, a random number, or some other monotonously increasing number. Another option is to use a consistency point count as the supplemental ID. A "consistency point" is the recurring event at which writes that have been buffered in memory of the storage server are committed to disk. The consistency point count, for any given data block, indicates the particular consistency point at which the data block was last written. The use of a consistency point count for this purpose is based on the assumption that a given block can only be written once during each consistency point.

A small random number (e.g., from 1-255), on the other hand, would not guarantee that it will be different from the number that is already written on disk. However, it may make that probability small enough to be acceptable considering how infrequently lost writes tend to occur.

Regardless of what is used as the supplemental ID, it changes only for full-stripe writes, not for partial-stripe writes. If no full stripe write occurs before a partial stripe write, that identifier will be 0, and it will stay 0 after a partial stripe write.

This approach, therefore, allows a full-stripe write to be done without a concurrent read, while still preserving the ability to identify a lost write to any block that is subsequently read.

Another optimization issue relates to the method of computing parity. Two ways to calculate parity are Recalculation and Subtraction. In Recalculation, all of the data blocks that are not being written are read to compute parity. Because the parity block is not read for Recalculation, an additional read to the parity disk will be incurred for verifying the GenCnt against the GenBmp. In Subtraction, all of the data blocks that are being written and the parity blocks are read to compute parity, so there is no additional performance cost here for verifying GenCnt against the GenBmp.

Therefore, the RAID layer 34 can decide which type of parity computation to use for any given write (Recalculation or Subtraction), depending on the number of data disks in the group to which data are being written. For example, when writing to half or fewer of the data disks in the group, parity is calculated by Subtraction, whereas when writing to more than half the data disks, parity is calculated by Recalculation. For Raid-DP, the GenCnt is stored on both of the parity disks in a parity group (i.e., Row Parity and Diagonal Parity); however, it is sufficient to read only one of the parity disks to verify GenCnt against the GenBmp. There is no read cost if writing to all of the blocks in a stripe.

Figure 5:
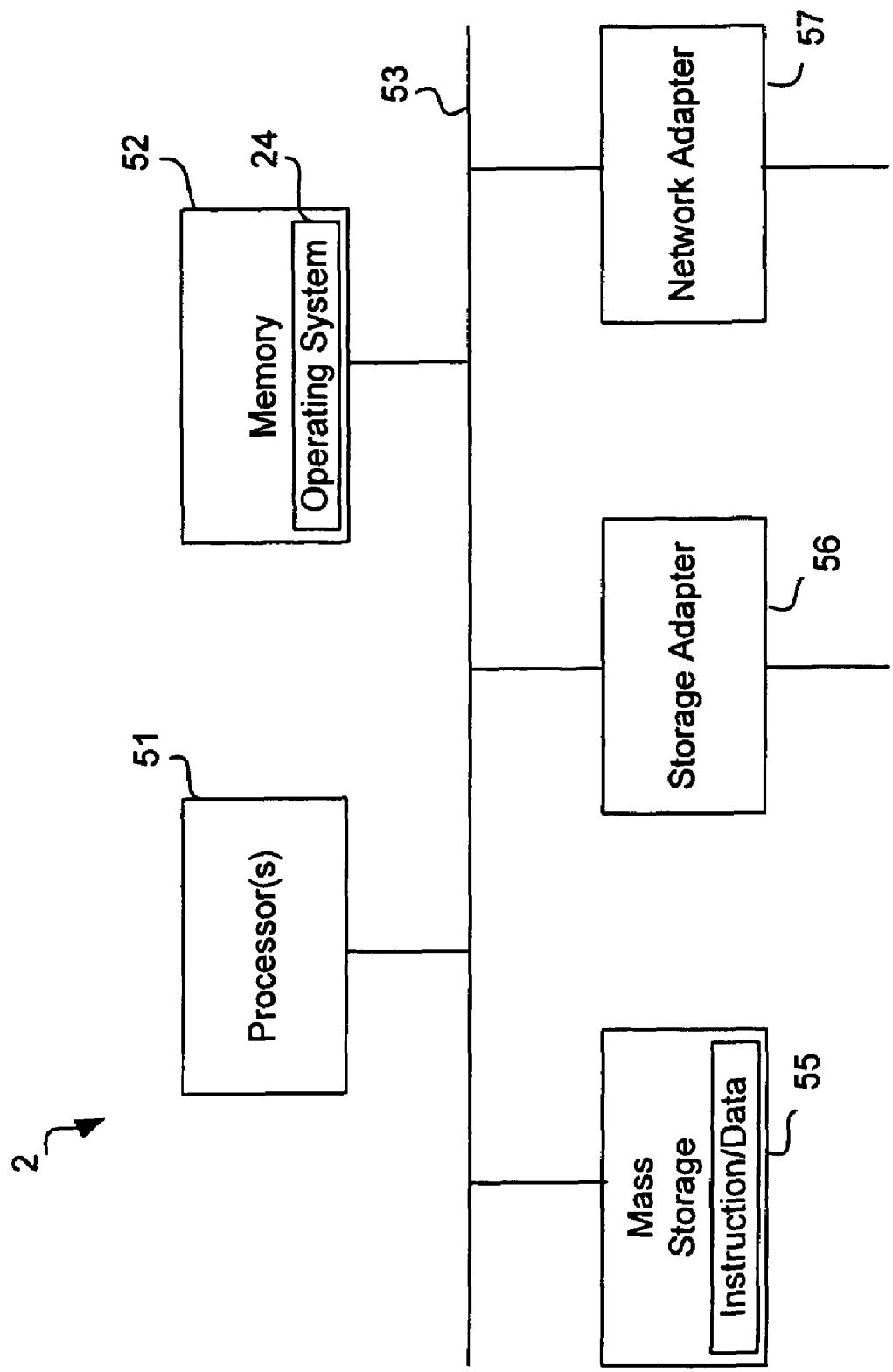
FIG. 5 is a high-level block diagram showing an example of the hardware architecture of the storage server.

FIG. 5 is a block diagram showing the architecture of the storage server 2, according to certain embodiments of the invention. Certain standard and well-known components which are not germane to the present invention may not be shown. The storage server 2 includes one or more processors 51 and memory 52 coupled to a bus system 53. The bus system 53 shown in FIG. 5 is an abstraction that represents any one or more separate physical buses and/or point-to-point connections, connected by appropriate bridges, adapters and/or controllers. The bus system 53, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 51 are the central processing units (CPUs) of the storage server 2 and, thus, control the overall operation of the storage server 2. In certain embodiments, the processors 51 accomplish this by executing software stored in memory 52. A processor 51 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 52 is or includes the main memory of the storage server 2. Memory 52 represents any form of random access memory (RAM), read-only memory (ROM), flash memory, or the like, or a combination of such devices. Memory 52 stores, among other things, the operating system 24 of the storage server 2, in which the error detection techniques introduced above can be implemented.

Also connected to the processors 51 through the bus system 53 are one or more internal mass storage devices 55, a storage adapter 56 and a network adapter 57. Internal mass storage devices 55 may be or include any conventional medium for storing large volumes of data in a non-volatile manner, such as one or more magnetic or optical based disks. The storage adapter 56 allows the storage server 2 to access the storage subsystem 4 and may be, for example, a Fibre Channel adapter or a SCSI adapter. The network adapter 57 provides the storage server 2 with the ability to communicate with remote devices, such as the clients 1, over a network and may be, for example, an Ethernet adapter.

Thus, a method and apparatus for detecting lost writes in a RAID layer of a storage server have been described.

A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

References throughout this specification to "one embodiment" or "an embodiment" mean that a particular feature, structure or characteristic described in connection with the embodiment is included in at least one embodiment of the present invention. Therefore, it is emphasized and should be appreciated that separate references in this specification to "an embodiment", "one embodiment" or "an alternative embodiment" are not necessarily all referring to the same embodiment. However, such references also are not necessarily mutually exclusive. Hence, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   operating a storage system that includes a set of mass storage media and a functional layer that provides a data storage path between a file system and the set of mass storage media; and
   using the functional layer to detect that a data block stored in a stripe in the set of mass storage media represents a lost write, wherein using the functional layer comprises:
   updating a generation count for the data block, the generation count being stored in association with the data block in the set of mass storage media and indicating a number of writes that have affected the data block; and
   updating, in a parity disk, a bitmap collectively representing the generation count for the data block and a generation count for other blocks in the stripe.

2. A method as recited in claim 1, wherein said using the functional layer comprises detecting that a data block in a mass storage device contains stale data.

3. A method as recited in claim 2, wherein the functional layer is a RAID layer of the storage system.

4. A method of operating a storage system, the method comprising:
   storing data in a plurality of stripes in a parity group that includes a plurality of data storage devices to store data and a parity storage device to store parity information, each stripe including a data block from each of the data storage devices and a data block from the parity storage device; and
   for each of the stripes,
   maintaining a generation count for each data block in the stripe, each generation count being indicative of a number of writes that have been done to the corresponding data block;
   storing each generation count with the corresponding data block in the corresponding one of the data storage devices;
   maintaining a collective generation value representing the generation counts for all of the data blocks in the stripe collectively; and
   storing the collective generation value in the parity storage device.

5. A method as recited in claim 4, determining whether a data block within a stripe contains stale data, based on a comparison of the generation count for the data block with the collective generation value for the stripe.

6. A method as recited in claim 5, wherein said determining whether a data block within a stripe contains stale data is performed by a RAID layer of the storage system.

7. A method as recited in claim 5, further comprising:
   determining that the data block contains stale data if the generation count for the data block does not correspond to a corresponding portion of the collective generation value.

8. A method as recited in claim 5, wherein determining whether the data block contains stale data is done during a process of scrubbing the parity group.

9. A method as recited in claim 5, wherein determining whether the data block contains stale data is done during a process of reconstructing a storage device in the parity group.

10. A method as recited in claim 4, further comprising, when writing a data bock in a storage device within a stripe: updating the generation count for the data block in the storage device; and
    updating the collective generation value for the stripe in the parity storage device to reflect the updating of the generation count for the data block.

11. A method as recited in claim 4, wherein storing each generation count with the corresponding data block comprises storing each generation count in a set of metadata appended to the corresponding data block.

12. A method as recited in claim 11, wherein each said set of metadata includes a checksum for the corresponding data block.

13. A method as recited in claim 11, wherein storing each collective generation value comprises storing each collective generation value in a set of metadata appended to a parity block that corresponds to a stripe to which the collective generation value relates.

14. A method as recited in claim 4, further comprising:
    when writing to all of the data blocks in a stripe in the parity group,
    generating a new generation count for each of the blocks in the stripe without reading any of the blocks in the stripe,
    generating a supplemental identifier for all of the blocks in the stripe, the supplemental identifier being identical for all of the blocks in the stripe, and
    storing the new generation count and the supplemental identifier with each of the blocks in the stripe; and
    determining whether a data block in the stripe contains stale data based on:
    a comparison of the new generation count stored with the data block against a corresponding collective generation value for the stripe, and
    a comparison of the supplemental identifier stored with the data block against a supplemental identifier stored for the stripe in the parity storage device.

15. A method as recited in claim 4, further comprising:
    generating a parity identifier to identify the parity storage device;
    storing the parity identifier with each data block in each of the data storage devices; and
    determining whether a data block contains stale data based on a comparison of the generation count for the data block with the collective generation value for a stripe which contains the data block, wherein said determining includes using the parity identifier stored with the data block to identify the storage device which contains the collective generation value.

16. A method as recited in claim 4, further comprising:
    for each of the data storage devices, storing a storage device identifier of the data storage device with each block of said data storage device; and
    using the storage device identifier stored with a block on one of the data storage devices to determine if the block is protected against a lost write.

17. A storage server comprising:
    a client interface through which to receive a data access request from a client;
    a storage interface through which to access a set of mass storage devices in response to the data access request;
    a file system to issue a write, the write for causing data to be written to a data block of a storage device in the set of mass storage devices; and
    a storage layer, operatively in a data storage path between the file system and the set of mass storage devices, to detect that the write has not been recorded in the data block of the storage device in the set of mass storage devices, wherein the set of mass storage devices includes a plurality of stripes, each of the stripes, including a data block from each of the mass storage devices in the set of mass storage devices, and wherein the storage layer is configured to, for each of the stripes, maintain a generation count for each data block in the stripe, each generation count being indicative of a number of writes that have been done to the corresponding data block;

store each generation count with the corresponding data block in the corresponding one of the mass storage devices disks;

maintain a collective generation value representing the generation counts for all of the data blocks in the stripe collectively; and store the collective generation value in a parity storage device in the set of mass storage devices disks.

18. A storage server as recited in claim 17, wherein the storage layer is part of a RAID layer of the storage server.

19. A storage server as recited in claim 17, wherein the storage layer further is configured to determine whether a data block within a stripe contains stale data, based on a comparison of the generation count for the data block with the collective generation value for the stripe.

20. A storage server comprising:

a processor unit;

a client interface, coupled to the processor unit, through which to communicate with a client;

a storage interface, coupled to the processor unit, through which to access a parity group that includes a plurality of data disks to store data and a parity disk to store parity information relating to the data, the parity group including a plurality of stripes, each stripe including a data block from each of the data disks and a data block from the parity disk; and a memory storing software which, when executed by the processor unit, causes the storage server to write to a data block within a stripe on one of the data disks and, in conjunction with writing to the data block, to:

update a generation count for the data block on said one of the disks, the generation count being stored in association with the data block on said one of the disks and indicating a number of writes that have affected the data block; and update, in the parity disk, a bitmap collectively representing the generation count for the data block and a generation count for each other block in the stripe.

21. A storage server as recited in claim 20, wherein the software is further to cause the storage server to determine whether the data block contains stale data, based on a comparison of the generation count for the data block with the generation bitmap.

22. A storage server as recited in claim 21, wherein the software is part of a RAID layer of the storage server.

23. A storage server as recited in claim 21, wherein the software is further to cause the storage server to determine that the data block contains stale data if the generation count for the data block does not match a corresponding portion of the generation bitmap.

24. A storage server as recited in claim 20, wherein the software is further to cause the storage server to store the generation count in a set of metadata appended to the data block.

25. A storage server as recited in claim 24, wherein the set of metadata includes a checksum for the data block.

* * * * *